(12) United States Patent
Yu et al.

(10) Patent No.: US 9,929,445 B2
(45) Date of Patent: Mar. 27, 2018

(54) INCORPORATING REFERENCE ELECTRODES INTO BATTERY POUCH CELLS

(71) Applicant: GM GLOBAL TECHNOLOGY OPERATIONS LLC, Detroit, MI (US)

(72) Inventors: Zhiqiang Yu, Shanghai (CN); Haijing Liu, Shanghai (CN); Xiaochao Que, Shanghai (CN); Qiang Wu, Shanghai (CN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 105 days.

(21) Appl. No.: 15/100,409

(22) PCT Filed: Dec. 13, 2013

(86) PCT No.: PCT/CN2013/089395
§ 371 (c)(1),
(2) Date: May 31, 2016

(87) PCT Pub. No.: WO2015/085580
PCT Pub. Date: Jun. 18, 2015

(65) Prior Publication Data
US 2016/0308260 A1    Oct. 20, 2016

(51) Int. Cl.
*H01M 4/00* (2006.01)
*H01M 10/48* (2006.01)
(Continued)

(52) U.S. Cl.
CPC ........... *H01M 10/48* (2013.01); *H01M 2/021* (2013.01); *H01M 4/131* (2013.01); *H01M 4/136* (2013.01);
(Continued)

(58) Field of Classification Search
CPC .... H01M 2/021; H01M 4/485; H01M 4/5825; H01M 4/661; H01M 10/0525;
(Continued)

(56) References Cited

U.S. PATENT DOCUMENTS

2006/0172185 A1   8/2006  Mimura
2011/0143207 A1*  6/2011  Arora .................... H01M 2/162
                                                          429/231.3

FOREIGN PATENT DOCUMENTS

CN      1815798 A1    8/2006
CN      102214843 A   10/2011
JP      2011003318 A   6/2011

OTHER PUBLICATIONS

International Search Report and Written Opinion dated Sep. 1, 2014 for application No. PCT/CN2013/089395; 12 pages.

* cited by examiner

*Primary Examiner* — Mark F. Huff
*Assistant Examiner* — Monique M Wills
(74) *Attorney, Agent, or Firm* — Reising Ethington P.C.

(57) ABSTRACT

Some lithium-ion batteries are assembled using a plurality of electrically interconnected battery pouches to obtain the electrical potential and power requirements of the battery application. In this disclosure, such battery pouches are prepared to contain a stacked grouping of inter-layered and interconnected anodes, cathodes, and separators, each wetted with a liquid electrolyte. A pair of reference electrodes is combined in a specific arrangement with other cell members to enable accurate assessment of both anode group and cathode group performance, and to validate and regenerate reference electrode capability.

20 Claims, 3 Drawing Sheets

(51) Int. Cl.
*H01M 2/02* (2006.01)
*H01M 4/485* (2010.01)
*H01M 4/58* (2010.01)
*H01M 4/66* (2006.01)
*H01M 10/0525* (2010.01)
*H01M 10/0585* (2010.01)
*H01M 4/131* (2010.01)
*H01M 4/136* (2010.01)
*H01M 4/80* (2006.01)
*H01M 10/04* (2006.01)
*H01M 4/02* (2006.01)

(52) U.S. Cl.
CPC ......... *H01M 4/485* (2013.01); *H01M 4/5825* (2013.01); *H01M 4/661* (2013.01); *H01M 4/80* (2013.01); *H01M 10/0525* (2013.01); *H01M 10/0585* (2013.01); *H01M 10/0445* (2013.01); *H01M 2004/021* (2013.01); *Y02T 10/7011* (2013.01)

(58) Field of Classification Search
CPC ....... H01M 10/0585; H01M 2004/021; H01M 4/80; H01M 4/136; H01M 4/131; H01M 10/48; Y02T 10/7011
See application file for complete search history.

INCORPORATING REFERENCE ELECTRODES INTO BATTERY POUCH CELLS

TECHNICAL FIELD

Some lithium-ion batteries are assembled using a selected number and arrangement of electrically interconnected battery pouches, each pouch containing a like, stacked, grouping of inter-layered and interconnected anodes, cathodes, and separators, and permeated with a liquid electrolyte. In accordance with this disclosure, a pair of reference electrodes is combined in a specific arrangement with other cell members to enable accurate assessment of pouch performance, and to validate and regenerate reference electrode capability.

BACKGROUND OF THE INVENTION

Assemblies of lithium-ion battery cells are finding increasing applications in providing motive power in automotive vehicles. Lithium-sulfur cells are also candidates for such applications. Each lithium-ion cell of the battery is capable of providing an electrical potential of about three to four volts and a direct electrical current based on the composition and mass of the electrode materials in the cell. The cell is capable of being discharged and re-charged over many cycles. A battery is assembled for an application by combining a suitable number of individual cells in a combination of electrical parallel and series connections to satisfy voltage and current requirements for a specified electric load, such as a traction motor for a vehicle. In a lithium-ion battery application for an electrically powered vehicle, the assembled battery may, for example, comprise up to three hundred cells that are electrically interconnected to provide forty to four hundred volts and sufficient electrical power to an electrical traction motor to drive a vehicle. Sometimes, groups of lithium-ion cells are placed in like-shaped pouches or packages for assembly and interconnection in forming a specified battery voltage and power requirement. The direct current produced by the battery may be converted into an alternating current for more efficient motor operation.

The batteries may be used as the sole motive power source for electric motor driven electric vehicles or as a contributing power source in various types of hybrid vehicles, powered by a combination of an electric motor(s) and hydrocarbon-fueled engine. There is a desire to reduce the cost of producing the respective elements of each lithium-ion electrochemical cell. And there is a continual desire to improve the function and reliability of each element of the battery.

A lithium-ion cell, or a group of such cells, may also require the addition of a reference electrode, composed for use in assessing the performance of the cell during its repeated discharge/re-charge cycling. There is a need for improved design, placement, and employment of a reference electrode in lithium-ion batteries. And there is a need for the improved design, placement, and employment of a reference electrode in some association with pouches or other packages of assembled cells that are combined and interconnected in the assembly of a battery.

SUMMARY OF THE INVENTION

This invention provides an arrangement of a grouping of lithium-ion anode and cathode cell units, with a reference electrode and an auxiliary reference electrode, for incorporation into a self-contained battery pouch. The two reference electrodes are strategically located in proximity to a specifically constructed anode of the grouping of cell units, and to share contact with a common liquid electrolyte.

The battery pouch may, for example, be rectangular in shape with an anode group terminal, a cathode group terminal, a first reference electrode tab, and an auxiliary reference electrode tab, each extending outwardly from the top or other selected side of the pouch. The battery pouch may be combined with other like pouches in the assembly of a battery with specified electrical potential and power requirements for a vehicle application or other electrical load application. In the assembly of such a battery, a selected number of like pouches may be placed in a suitable container and appropriate electrical connections made between anode and cathode terminals of the pouches. The connector tabs for the reference electrode and auxiliary electrode in each pouch are used, as described herein, to assess the performance of the electrically parallel connected anodes and parallel connected cathodes in the pouch to manage their contribution to the performance of the battery. Typically, a computer-based control system is used to manage the discharging and re-charging of the electrochemical cells of the battery. Such a computer-based control system may be programmed and used to manage high impedance connections (that draw a very low current) between a reference electrode and the anode and cathode terminals of each battery pouch.

In accordance with embodiments of this invention, a plurality of cell elements are prepared as like-shaped sheets for grouping, stacking, and placement in like-shaped, thin, flexible wall pouches, formed of aluminum foil and coated on each side with an electrically insulating layer of a suitable polymer composition. In many embodiments of the invention it is preferred that the cell element sheets and pouch container be of complementary rectangular shapes.

Each lithium-ion cell typically comprises a negative electrode layer (anode, during cell discharge), a positive electrode layer (cathode, during cell discharge), a thin porous separator layer that is interposed in face-to-face contact between parallel faces of electrode layers, and a liquid, lithium ion-containing, electrolyte solution infiltrating, permeating, and filling the pores of the separator and contacting porous facing surfaces of the electrode layers for transport of lithium ions during repeated cell discharge and re-charge cycles. Each electrode is prepared to contain a layer of an electrode material, deposited on one or both sides of a thin layer (e.g., a foil) of a metallic current collector. The current collector is formed with an uncoated tab, often located on the intended top side of the metal foil, for electrically connecting the electrode to another electrode in the assembly of the cell members of a lithium-ion battery pouch.

In an illustrative example, negative electrode material may be formed by depositing a thin layer of graphite particles, often mixed with conductive carbon black, and, optionally, a suitable polymeric binder onto one side or both sides of a thin foil of copper that serves as the current collector for the electrons flowing from the negative electrode during cell discharge. The positive electrode also comprises a thin layer of resin-bonded, porous, particulate lithium-metal-oxide composition bonded to a thin foil of aluminum that serves as the current collector for the positive electrode. Thus, the respective electrodes may be made by fixing, depositing, or bonding suitable electrode particles to their respective current collector surfaces. Depending on an intended arrangement in an assembled stack-up of electrodes, it is often desired to apply thin layers of electrode material to both sides of a metal current collector foil.

In preferred embodiments of the invention, a plurality of lithium-ion cell units are assembled in the form of a stack of thin, complementarily-sized and like-shaped sheet members for placement in a polymer-coated, metal pouch. By way of illustrative example, fourteen rectangular sheets of graphite/carbon anode material layers applied on both faces of non-porous copper current collector foil and fourteen, slightly smaller, rectangular sheets of lithium (cobalt-manganese-nickel) oxide cathode material layers applied on both faces of non-porous aluminum current collector foil may be used. The copper foils are often used in thicknesses of about ten micrometers (suitably six to twenty micrometers), the aluminum foils in thicknesses of about twenty micrometers (suitably ten to thirty micrometers), and the respective active electrode material is typically applied to a uniform thickness of about sixty micrometers to one or both faces of each foil. Typically, the anode layers are required to "cover" the cathode layers and so the heights and lengths of the rectangular anodes are slightly greater than the corresponding dimensions of the cathodes. A pouch may, for example, comprise five to thirty pairs of such anodes and cathodes.

The predetermined number of pairs of two-side coated anodes and cathodes may be varied depending on the desired electrical potential and electrical power of the stack. The two-sided anode sheets and cathode sheets are stacked alternately with coextensive rectangular porous separator sheet layers between each electrode and lying against an active material-coated face of each electrode. Often, the separator sheet is prepared as a strip of suitable length, which is folded back and forth between the coated faces of the anode sheets and cathode sheets assembled in the stack. The separator sheet may, for example, be formed of a porous polyolefin (polyethylene, polypropylene, or mixtures or copolymers). Thus, in this initial stack, a two-side coated cathode sheet occupies one end of the linear stack and a two-side coated anode sheet occupies the other end of the stack. Where, for example, this initial stack is to include fourteen two-sided anode sheets and fourteen two-sided cathode sheets, there will be a separator sheet strip with twenty-seven folded separator surfaces included in the assembled stack with a separator sheet surface between each facing anode and cathode surface. But in order to utilize two reference electrodes, in accordance with this invention, additional cell members are included in the stack before it is ready for placement in its pouch container.

A separator sheet is placed against the two-sided cathode sheet at one end of the preliminary stack. And a copper current collector foil, coated only on one side or face with anode material is placed with its coated side lying against the separator sheet and facing toward the two-side coated cathode member located at the end of the preliminary stack. But this copper current collector foil is prepared with small holes or pores extending through the thickness of the foil from one face through its opposing face. The small pores or holes are distributed over the facial area of the copper foil in a proportion of hole or pore area to the rectangular outline area of the foil so as to provide pathways over the face of the foil suitable for infiltration and permeation with a liquid lithium-ion containing electrolyte. The diameter of the holes or pores is suitably in the range of about (0.001 mm to 1 mm). The area of the holes or pores may be up to about ninety-eight percent of the outline area or superficial area of the foil surface. This arrangement of stacked lithium-ion cell member layers is devised to accommodate a reference electrode member and an auxiliary reference electrode member at the end of the stack with its one-side coated anode member.

In embodiments of this invention, two substantially identical reference electrodes are prepared using either lithium iron phosphate (empirical formula, $Li_{0.5}FePO_4$) or lithium titanate (empirical formula, $Li_{5.5}Ti_5O_{12}$) as the reference electrode material in both reference electrodes. The composition of the lithium iron phosphate may vary as $Li_{1-x}FePO_4$, where $0<x<1$, as long as the electrochemical potential of the reference electrode is in a flat voltage plateau. It is preferred that each reference electrode display a flat voltage plateau during operation of the pouch cell so as to enhance variations in the potentials of the anodes and cathodes in the cell. The composition of the lithium titanate may vary as $Li_{4+x}Ti_5O_{12}$, where $0<x<3$, as long as the electrochemical potential of the reference electrode is in a flat voltage plateau. The reference electrode layer is applied in a porous layer (permeable by liquid electrolyte) of substantially uniform thickness (e.g., about 60 micrometers) to both faces of a porous copper or aluminum foil of substantially the same size and shape as the rest of the stack of cell materials. When the reference electrodes are both $Li_{1-x}FePO_4$, a porous aluminum foil is used. When the reference electrodes are both $Li_{4+x}T_5O_{12}$, a porous aluminum or a porous copper current collector foil is used for both reference electrodes. A first such reference electrode member is placed against and coextensive with the porous separator member and opposing, one-side coated anode member. Another porous separator sheet is placed against the outer coated side of the first reference electrode and a second (auxiliary), like coated and sized, electrode is placed against the separator. The porous copper or aluminum sheets, carrying the same reference electrode material on both sides, have tabs at their top sides for interconnection with anode group and cathode group terminal elements of the stack of cell materials.

The upstanding tab members of each of the assembled stack of anode members (fifteen anode members in this example) may be joined in electrical parallel connection to an anode group terminal strip. The tab members of the cathode members (fourteen cathode members in this example) may likewise be separately joined to a cathode group terminal strip. The respective tab members are of predetermined length to accommodate the joining of the several tabs and it may be preferred to accomplish the joining and the attachment of the group electrode terminal near the middle of the stack.

The upstanding connector tabs on the main and auxiliary reference electrodes stand alone, but within a connectable distance to the anode group terminal and the cathode group terminal. The dry assembled stack may now be placed in a suitable pouch with the electrode groups' terminals and reference electrode tabs extending in a parallel attitude, out of the unclosed opening of the pouch. A volume of liquid lithium-ion containing electrolyte is carefully placed or loaded into the pouch so as to fully wet the active material of each electrode (active and reference electrodes) and separator in the assembled stack. The electrolyte is applied so as to suitably infiltrate, permeate, and wet all intended electrode and separator surfaces without an unwanted excess of liquid. The pouch is suitably evacuated of unwanted gas or vapor, and closed and sealed over the cell materials and around the extending anode and cathode group terminals and the tabs of the two reference electrodes. Four conductive connector strips are thus exposed at a selected side of the sealed pouch.

Thus, the pouch of a predetermined plurality of cell units also contains two reference cell elements, located side-by-side with an intervening separator, wetted by a common electrolyte, and positioned for suitable testing of the anode group and cathode group members of the cell. The two identical reference cells are situated for use to validate each other. And the auxiliary reference electrode can be charged or discharged, using the active cell members, to regenerate the principal reference electrode. The location of the reference electrodes in close proximity to the one-side coated anode member is important in using the reference electrode to obtain accurate measurement of the anode group potential or the cathode group potential of the pouch elements.

Other objects and advantages of this invention will be apparent from a detailed description of preferred embodiments which follow in this specification.

BRIEF DESCRIPTION OF THE DRAWINGS

FIG. 1 illustrates a stack of lithium-ion cell members with both expanded and un-expanded portions of the stack. Of course, in use, no portion of the stack is expanded.

FIG. 2 shows the elements of stack with one example of the positioning of active cell terminals and reference cell tabs. An anode member and cathode member at the center of the stack are shown in more detail than adjacent anodes and cathodes in the stack. The anode member at one end of the stack and the reference electrodes are also shown in some detail. The stack is illustrated as ready for placing in a pouch container and for infiltration with a liquid, lithium-ion cell electrolyte.

DESCRIPTION OF PREFERRED EMBODIMENTS

Some types of relatively large lithium-ion batteries are made by preparing packages or pouches of, for example, ten to fifteen pairs of alternating anode members and cathode members, separated from direct electrical contact by porous, electrically insulating, separators. A suitable number of such pouches are assembled in a battery container and electrically connected to form a desired battery. It is typically desired to provide reference electrodes to assess the performance of the individual pouches and of the assembled battery. In accordance with practices of this invention, the organization and arrangement of the reference electrodes and the active members of lithium-ion cells in a pouch is important.

Figure 1:
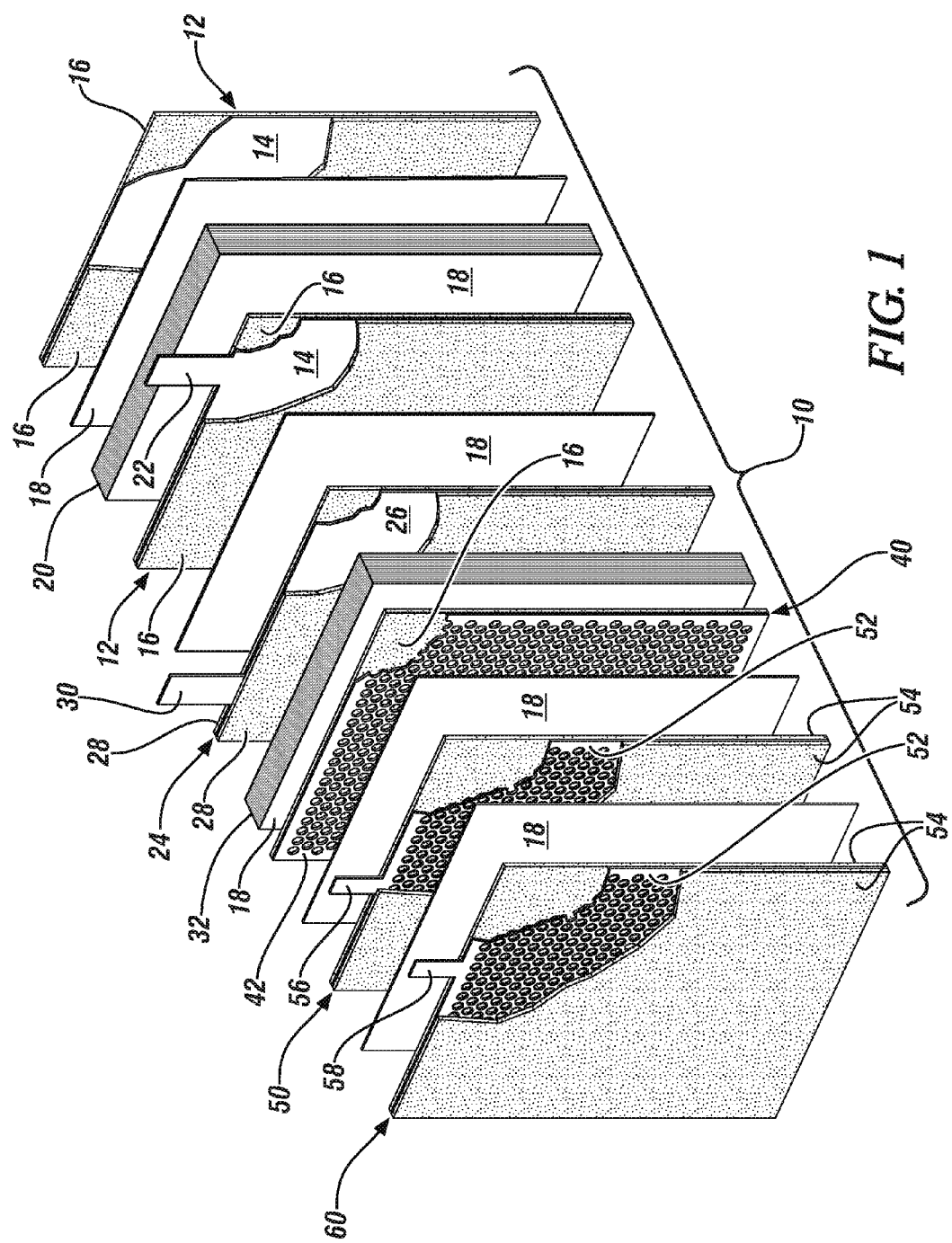
FIG. 1 is an oblique view of a stack of active electrode elements with interposed separator elements, as viewed from the right end toward the left end of the illustration, with two reference electrode elements at the front or left end of the stack. The illustration is expanded at a central location within the active electrode portion of the stack to show the construction of a cathode, separator and an anode. And the illustration is expanded at the left end of the stack to better describe the construction and positioning of the reference electrodes. Thus.
Figure 2:
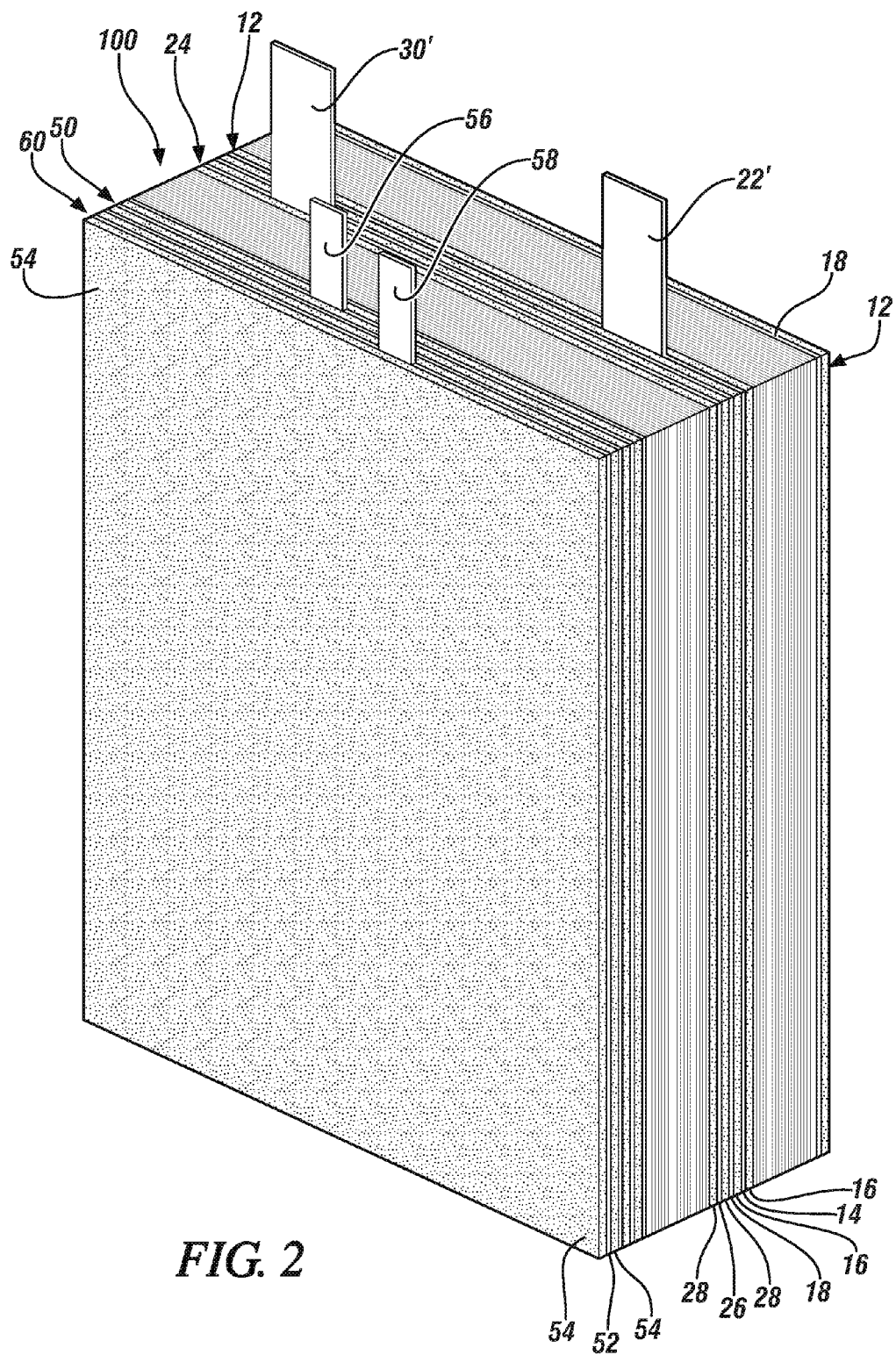
FIG. 2 is an illustration of the stack of FIG. 1 with the members of the stack lying in their face-to-face positions.
Figure 3:
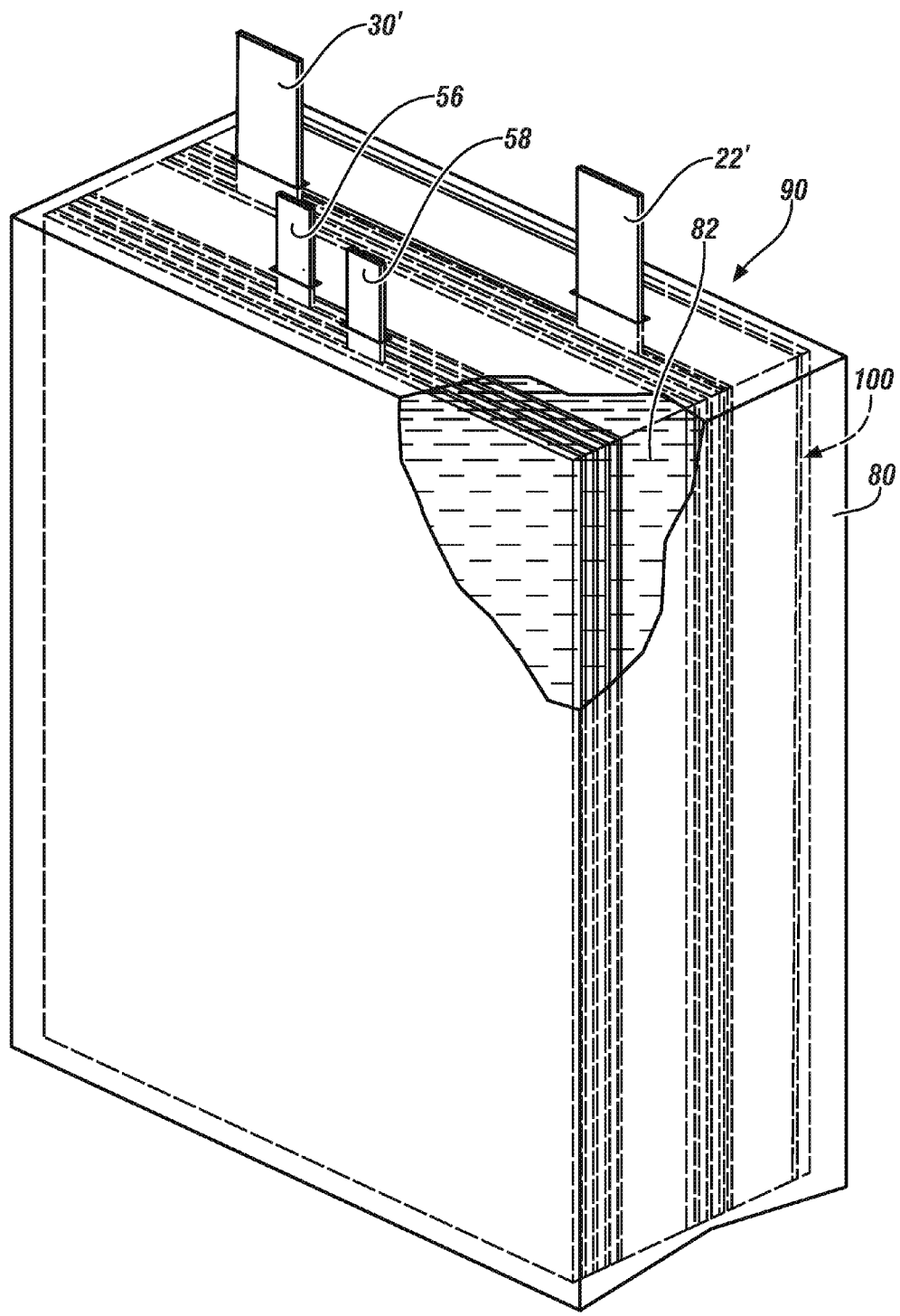
FIG. 3 is an illustration of a pouch container, filled with the stack elements of FIGS. 1 and 2, and a liquid electrolyte. The pouch may be combined and assembled with other like pouch cell containers in the making of a lithium-ion battery. The anode group and cathode group connector terminals extend from the top of the pouch for connection with other terminals in a battery assembly. The reference electrode tabs are positioned for connection with an electrode terminal of the pouch container or with each other.

FIG. 1 illustrates a preferred embodiment of this invention. In a typical battery pouch of this illustration, the ten to fifteen pairs of the respective cell members are of generally flat, rectangular shape (like playing cards) and assembled face-to-face like a stack of playing cards. Such an arrangement is illustrated in FIGS. 2 and 3, which will be described in more detail in later paragraphs of this specification. But in FIG. 1 some of the members of stack 10 of cell members are spaced-apart for illustration of their structure, while other members are placed in their normal stack position. The expanded illustrations of portions of stack 10 as illustrated in FIG. 1 is for purposes of better illustrating the structures and locations of certain members in a stack arranged in accordance with this invention.

At the right end of stack 10 is an anode 12. In this example, anode 12 has a rectangular shape. It is formed of a non-porous cupper foil 14 which serves as a current collector for the anode. The copper foil current collector 14 is typically about ten micrometers thick. The copper current collector foil 14 is coextensively coated on both sides with an active anode material 16 (such as commercially available MesoCarbon MicroBeads graphite, MCMB) that is suitable for a lithium-ion cell anode. The thickness of each layer of active anode material may be about sixty micrometers. Copper foil current collector 14 would also have an upstanding, uncoated, tab which is not illustrated in the drawing figures to simplify the figures, but which enables anode 12 to be electrically connected in parallel connection to the other anodes in the stack 10.

Proceeding from right to left in FIG. 1, next to anode 12 is a porous single layer separator 18 which separates anode 12 from an adjacent cathode in the stack. Numeral 20 refers to a stack portion of a cathode, a separator, an anode, a separator, etc. proceeding to the left in FIG. 1. Each cell member is placed, face to face, against a complementary cell member. The stack represented by numeral 20 may represent six or so groups of cell member groupings with the last cell member in that illustrated stack portion 20 being a separator 18. Following right-to-left from stack portion 20, is another anode 12, which is located in a generally central position in the stack of active electrode members. Anode 12, located centrally in the stack, is substantially identical in size, shape, and composition to anode 12 located at the right end of the stack 10 as illustrated in FIG. 1. Anode 12, located centrally in the stack, comprises a copper foil current collector 14 which is coated on both sides with active anode material 16. And anode 12 has an uncoated tab 22 for joining in an electrical connection with the other anodes in the overall stack. Since there are, for example, fourteen anodes 12 coated on both sides with anode material 16, most of the uncoated anode connector tabs have not been illustrated in the drawing figures. But each connector tab may be of the same length, long enough for each tab to be bent to reach and be joined to the connector tab 22 of the anode 12 which is placed near the center of the overall stack. The joining of each of the anode current collector tabs to a central tab constitutes a terminal for the anode group in the overall stack.

As illustrated in the stack 10 of FIG. 1, separator 18 is positioned to the left of centrally located anode 12. And to the left of separator 18 in this expanded portion of stack 10 is cathode 24. While this expanded portion of stack 10 permits the illustration of a centrally located cathode 24, it is to be understood that each cathode 24 is substantially identical in size, shape, and structure, except, perhaps for the retained length of their uncoated connector tabs 30. Each cathode 24 comprises a thin, non-porous aluminum foil 26 as its current collector substrate. Each side of the aluminum current collector foil 26 is coated or covered suitable active cathode materials 28. A suitable cathode material is $Li(Ni_{1/}$ $_3Mn_{1/3}Co_{1/3})O_2$. In general, examples of suitable cathode materials include particles of lithium-metal-oxide compounds or compositions, such as lithium-manganese-oxide, lithium-nickel-oxide, and/or lithium-cobalt-oxide.

Again, the uncoated cathode connector tabs on most of the fourteen cathodes are not illustrated to simplify FIG. 1. But the respective cathode connector tabs 30 are trimmed or sized to be connected to a centrally located tab 30 to interconnect each of the cathodes 24 and to form a cathode group terminal.

Proceeding to the left in FIG. 1 from the expanded central portion of stack 10, illustrating the two-side coated anode 12 and cathode 24, is another smaller stack portion 32, starting with a separator, continuing with combinations of anode, separator, and cathode, and ending with a cathode and a separator 18. This is the portion of the overall stack of lithium ion cell members in which two reference electrodes are to be positioned.

Positioned to separator 18 at the left side of small stack portion 32 is a special anode structure 40. Anode structure 40 consists of a porous copper current collector foil 42 that is coated on only one side with an anode material 16. Preferably, anode material 16 is identical in composition to the anode material applied to the other anodes 12 in the stack. And, as illustrated in FIG. 1, the anode material 16 is positioned next to the separator 18 at the end of stack portion 32. But, importantly, in anode 40, the anode material 16 is applied to only one side of the porous copper current collector 42.

Porous copper foils and aluminum foils are commercially available for other applications.

The porous copper current collector foil 42 may, for example, be formed by forming laser-cut holes or by punching holes in a dense copper foil. A laser beam can cut holes as small as about one micrometer in copper foil that is about ten micrometers thick. Holes as large as 0.1 to about one millimeter may be punched. The sizes of the holes may be in the range of about one micrometer to about one millimeter. The porosity of the copper current collector is to enable liquid electrolyte to flow through the current collector foil 42, just as the electrolyte permeates the anode material 16. Suitably, the pore area of current collector foil 42 is in the range of about 0%<x<98% of the outline rectangular face area of the copper current collector foil 42.

As illustrated in FIG. 1, a separator 18 is placed against the porous copper current collector foil 42 of anode 40. A reference electrode 50 is then stacked against that separator 18. It is important that this main reference electrode be placed near an end of the linear stack and separated by a single layer separator 18 from the anode member (40 in FIG. 1) in which the layer of anode material is placed on one side of a porous copper current collector foil.

As stated above in this specification, two substantially identical reference electrodes are prepared using either lithium iron phosphate (empirical formula, $Li_{0.5}FePO_4$) or lithium titanate (empirical formula, $Li_{5.5}Ti_5O_{12}$) as the reference electrode material in both reference electrodes. If the reference and auxiliary electrodes use lithium iron phosphate as the electrode material a porous aluminum current collector foil may be used. If both electrodes use lithium titanate as the electrode material, either a porous aluminum or a porous copper current collector foil may be used. Thus, reference electrode 50 may comprise a porous aluminum current collector foil 52 which may be of substantially the same size and shape and porosity as the current collector foil used in anode 40. But the porous aluminum current collector foil 52 for reference electrode 50 is coated on both sides with a porous layer 54 of either lithium iron phosphate or lithium titanate as the active reference electrode material. A porous separator layer 18 lies against each of outer surfaces of the porous layers 54 of the reference electrode 50. The porous aluminum foil current collector 52 comprises a tab 56 for enabling an electrical connection to an anode terminal (e.g., 22 in FIG. 1 or 22' in FIGS. 2 and 3) or a cathode terminal (e.g., 30 in FIG. 1 or 30' in FIGS. 2 and 3) during evaluation of the performance of the anode group or cathode group of the stack.

An auxiliary reference electrode 60, which is substantially identical in shape and composition to reference electrode 50, is placed at the end of the stack against a separator 18 (at the left end of stack 10). Thus, auxiliary electrode 60 also comprises a porous aluminum current collector foil 52 (or optionally copper, if a lithium titanate reference electrode material is used) which is coated on both sides with a porous layer 54 of the same active reference electrode material as used in reference electrode 50. Although auxiliary reference electrode 60 is substantially identical to reference electrode 50, it usually serves a different, but complementary, function with respect to the function of reference electrode 50. Electrical connector tab 56 on reference electrode 50 is available for connection to either the terminal (22' in FIGS. 2 and 3) for the parallel connected anodes or the terminal (30' in FIGS. 2 and 3)—one at a time. Such a connection could be made by use of a connector and electrical meter provided in a fully assembled lithium-ion battery containing several pouches of cell elements and apparatus for managing charging and discharging of the battery.

Connector tab 58 on auxiliary reference electrode 60 is typically connected to reference electrode tab 56 when it is desired to calibrate or regenerate reference electrode 50. Such calibration or regeneration actions are often undertaken in an assembled battery, under use, by a computer controlled system for managing discharging and re-charging of the battery and its pouch members.

FIG. 2 illustrates the cell members of the stack 10 as illustrated in FIG. 1 as an unexpanded stack 100. The members of the lithium-ion cell stack are illustrated in their intended and proper face-to face positions in the stack for assembly into a pouch container. However, the unexpanded stack 100 of FIG. 2 illustrates the multilayer structure of the anode 12 and cathode 24 members which are located centrally in the stack. Associated at the location of the current collector foil 14 of this specific anode 12 is an anode group terminal 22' and associated with the current collector foil 26 of this specific cathode 24 is a cathode group terminal 30'. And the illustration of the unexpanded stack 100 of FIG. 2 also illustrates the multilayer structure of the reference electrode 50 and the auxiliary reference electrode 60 at the end of the stack (the left end from the perspective illustrated in FIGS. 1, 2, and 3 of this specification).

After the respective active electrodes, reference electrodes, and interposed one-layer separators have been arranged in a stack as specified in this text, the stack is placed in a pouch container. The insertion of the stack into a pouch may be carried out in a managed air environment of ambient temperature, less than five percent relative humidity, and less than one bar pressure to accommodate suitable filling of the pouch and insertion of the selected electrolyte into the stack so that the lithium-ion containing liquid infiltrates, permeates, and fills all the intended pores and interstices of each member of the stack with no retained air or other unwanted gas in the stack. While still in this packaging environment, the pouch is closed around the lithium-ion cell members stack with the anode group terminal, the cathode group terminal, the reference electrode tab, and the auxiliary reference electrode tab extending though a surface pouch, with a suitable seal between the pouch wall and each of the electrical connectors to the stack within the pouch.

FIG. 3 is an illustration of the filled pouch 90. The stack 100 (as illustrated in FIG. 2 has been placed within pouch 80, and the top of the pouch 80 has been closed and sealed around anode group terminal 22', cathode group terminal 30', reference electrode tab 56, and auxiliary reference electrode tab 58. A portion of the pouch material is broken away and the dashed lines in FIG. 3 represent the presence of a liquid lithium-ion containing electrolyte 82 that wets surfaces of each active electrode member, each reference electrode member, and each separator in the stack 100. Suitable pouch containers are commercially available. A suitable and preferred pouch material is polymer coated aluminum foil. The polymer coating comprises multiple layers and is applied to both sides of the aluminum foil in the pouch container.

The electrolyte for the lithium-ion cell is often a lithium salt dissolved in one or more organic liquid solvents. Examples of salts include lithium hexafluorophosphate ($LiPF_6$), lithium tetrafluoroborate ($LiBF_4$), lithium perchlorate ($LiClO_4$), lithium hexafluoroarsenate ($LiAsF_6$), and lithium trifluoroethanesulfonimide. Some examples of solvents that may be used to dissolve the electrolyte salt include ethylene carbonate, dimethyl carbonate, methylethyl carbonate, propylene carbonate. There are other lithium salts that may be used and other solvents. But a combination of lithium salt and solvent is selected for providing suitable mobility and transport of lithium ions in the operation of the cell. The electrolyte is carefully dispersed into and between closely spaced layers of the electrode elements and separator layers.

In the above illustrated embodiments of the invention, each cell member of the stacked elements is rectangular in shape. In accordance with general practices of the invention the members of the stack do not have to be rectangular. But a rectangular stack in a rectangular pouch is a convenient shape for the assembly of a lithium-ion battery in many applications.

By way of illustration, without intention to limit the invention, a rectangular anode 57 mm in height and 52 millimeters in width may be used. Its connector tab would be located at the top side of its copper current collector foil near one vertical side to facilitate the electrical parallel connection of each of the anode foils in a stack. Typically, the thickness of the copper foil is in the range of about 6-20 micrometers, and the thickness of each coating of active material is about sixty micrometers. The thickness of the anode material is dependent on the electrochemical capacity required of it, and is typically in the range of about 10 micrometers to about 150 micrometers.

It is generally preferred that each anode layer "cover" the adjacent cathode layer and that the separator strip cover both electrodes. So each anode layer is slightly larger than the cathode layer and the separator strip is wider than the height of the anode. A complementary, suitable cathode, for example, may have a height of 55 millimeters and a width of 50 mm. Its connector tab would be located at the top side of its aluminum current collector foil near the other vertical side to facilitate the electrical parallel connection of each of the cathode foils in a stack. Typically, the thickness of the aluminum current collector foil for the cathode is in the range of about ten to thirty micrometers, and the thickness of each coating of active cathode material is about sixty micrometers. In this example, the separator strip is about 60 mm wide, so as to cover both the anode and cathode, and about 25 micrometers thick. The thickness of the cathode material is dependent on the electrochemical capacity required of it, and is typically in the range of about 10 micrometers to about 150 micrometers.

The height and width of rectangular anodes and cathodes is suitably in the range from ten millimeters to five hundred millimeters and the height and width of the anodes in a stack is slightly larger than the corresponding dimensions of the cathodes in the stack so that the anodes cover the cathodes. As stated the separator layer is sized to cover both the anode and cathode faces.

The invention has been described using specific examples. The examples are intended to illustrate preferred embodiments of the invention and not to limit its scope.

The invention claimed is:

1. An assembled linear stack of electrochemical cell members for a lithium-ion battery, the assembled linear stack comprising:

five to thirty lithium-ion cell, flat-layer, anode members, with opposing layer faces, interspersed in a first linear stack portion with an equal number of lithium-ion cell, flat-layer, cathode members with opposing layer faces, the flat-layer anode and cathode members having like face shapes, the face of each anode member being coextensively separated from the face of an adjacent cathode member in the first linear stack portion by a porous separator layer member, each anode member comprising a copper foil current collector coated on both foil faces with a layer of porous lithium-ion cell anode material and each cathode member comprising an aluminum foil current collector layer coated on both foil faces with a layer of porous lithium-ion cell cathode material, the first linear stack portion having a three-layer cathode member at a first end of the first linear stack portion and a three-layer anode portion at the opposite, second end of the first linear stack portion;

a porous separator layer member with opposing faces, one separator layer face co-extensively covering the layer of porous lithium-ion cell cathode material at the second end of the first linear stack portion and a two-layer lithium-ion cell anode member placed against the opposite face of the porous separator layer member, the two-layer lithium-ion cell anode member consisting of a porous layer of lithium-ion cell anode material carried on a porous copper foil, the anode material being against the opposite face of the separator layer; and a second linear stack portion comprising a first porous separator layer, a first reference electrode member, a second porous separator layer, and a second reference electrode member, the first porous separator layer of the second linear stack portion being placed against the porous copper current collector foil face of the two layer anode member, and the first and second reference electrode members each comprising a porous aluminum or porous copper current collector foil layer covered on at least one face with a reference electrode material, the reference electrode material on both reference electrodes being the same composition which is one composition selected from the group consisting of lithium iron phosphate and lithium titanate.

2. An assembled linear stack of electrochemical cell members for a lithium-ion battery as recited in claim 1 in which in the first linear stack portion each anode member copper foil current collector is non-porous and each cathode member aluminum foil current collector is non-porous.

3. An assembled linear stack of electrochemical cell members for a lithium-ion battery as recited in claim 1 in which the pore or hole opening area of the porous copper foil utilized in the two-layer lithium ion cell anode member is in the range of from about 0.01% to about 98% of the outline face area of the copper foil.

4. An assembled linear stack of electrochemical cell members for a lithium-ion battery as recited in claim 1 in which lithium iron phosphate reference electrode material is coated on one side or both sides of an aluminum current collector foil and the thickness of each coating of the lithium iron phosphate on a face of the aluminum current collector foil is in the range of 0.1 to 150 micrometers.

5. An assembled linear stack of electrochemical cell members for a lithium-ion battery as recited in claim 1 in which lithium titanate reference electrode material is coated on one side or both sides of an aluminum current collector foil and the thickness of each coating of the lithium titanate on a face of the aluminum current collector foil is in the range of 0.1 to 150 micrometers.

6. An assembled linear stack of electrochemical cell members for a lithium-ion battery as recited in claim 1 in which lithium titanate reference electrode material is coated on one side or both sides of a copper current collector foil and the thickness of each coating of the lithium titanate on a face of the copper current collector foil is in the range of 0.1 to 150 micrometers.

7. An assembled linear stack of electrochemical cell members for a lithium-ion battery as recited in claim 1 in which the pore or hole opening area of the porous aluminum current collector foil or porous copper current collector foil utilized in the two reference electrode members is the same and is in the range of from about 0.01% to about 98% percent of the outline face area of the aluminum or the copper foil.

8. An assembled linear stack of electrochemical cell members for a lithium-ion battery as recited in claim 1 in which the thicknesses of the nonporous copper foils used as anode current collectors are in the range of about six to twenty micrometers and the thicknesses of the nonporous aluminum foils used as cathode current collectors are in the range of about ten to about thirty micrometers.

9. An assembled linear stack of electrochemical cell members for a lithium-ion battery as recited in claim 1 in which the electrode members and the separator members are in the form of flat layered structures which are rectangular in shape.

10. An assembled linear stack of electrochemical cell members for a lithium-ion battery as recited in claim 1 in which the thicknesses of the coating layers of porous lithium-ion cell anode material and of porous lithium-ion cell cathode material are in the range of about ten to one hundred fifty micrometers.

11. An assembled linear stack of electrochemical cell members for a lithium-ion battery as recited in claim 9 in which the rectangular dimensions of the flat-layer anode members are larger than the rectangular dimensions of the flat-layer cathode members, and the rectangular dimensions of the separators are larger than the rectangular dimensions of the anode members.

12. An assembled linear stack of electrochemical cell members for a lithium-ion battery as recited in claim 9 in which the lengths of the sides of the rectangular layers are in the range of ten to five hundred millimeters.

13. An assembled linear stack of electrochemical cell members for a lithium-ion battery as recited in claim 1 in which the peripheral dimensions of the anode members are larger than the peripheral dimensions of the cathode members, and the peripheral dimensions of the separators are larger than the peripheral dimensions of the anode members.

14. An assembled linear stack of electrochemical cell members for a lithium-ion battery as recited in claim 1 in which each cell member is wetted with a liquid, lithium-ion containing electrolyte.

15. An assembled linear stack of electrochemical cell members for a lithium-ion battery as recited in claim 1 in which each anode member contains an electrical conductor tab on its copper foil current collector which tabs are joined as a common anode group terminal member in the assembled unit, each cathode member comprises a conductor tab on its aluminum foil current collector which tabs are joined as a common cathode group terminal member in the assembled unit, and the first and second reference electrodes each have a single conductor tab on their respective porous aluminum or copper current collector foils, such that the assembled unit presents four accessible members for electrical connection which extend from any container of the assembled unit.

16. An assembled linear stack of electrochemical cell members for a lithium-ion battery as recited in claim 1 in which the lithium iron phosphate reference electrode material is characterized by the formula, $Li_{(1-x)}FePO_4$, where x has a value in the range $0<x<1$ such that the lithium iron phosphate material of the reference electrode of the cell maintains a flat voltage plateau when connected to an anode or cathode material of the electrochemical cell.

17. An assembled linear stack of electrochemical cell members for a lithium-ion battery as recited in claim 1 in which the lithium titanate reference electrode material is characterized by the formula, $Li_{(4+x)}Ti_5O_{12}$, where x has a value in the range $0<x<3$ such that the lithium titanate reference material of the reference electrode of the cell maintains a flat voltage plateau when connected to an anode or cathode material of the electrochemical cell.

18. A battery pouch comprising an assembled linear stack of electrochemical cell members for a lithium-ion battery, the assembled linear stack comprising:

a predetermined number of lithium-ion cell, flat-layer, anode members, with opposing layer faces, interspersed in a first linear stack portion with an equal number of lithium-ion cell, flat-layer, cathode members with opposing layer faces, the flat-layer anode and cathode members having like face shapes, the face of each anode member being coextensively separated from the face of an adjacent cathode member in the first linear stack portion by a porous separator layer member, each anode member comprising a copper foil current collector coated on both foil faces with a layer of porous lithium-ion cell anode material and each cathode member comprising an aluminum foil current collector layer coated on both foil faces with a layer of porous lithium-ion cell cathode material, the first linear stack portion having a three-layer cathode member at a first end of the first linear stack portion and a three-layer anode portion at the opposite, second end of the first linear stack portion, the copper foil current collector of each anode member being connected to an anode group terminal and the aluminum foil current collector of each cathode member being connected to a cathode group terminal;

a porous separator layer member with opposing faces, one separator layer face co-extensively covering the layer of porous lithium-ion cell cathode material at the second end of the first linear stack portion and a two-layer lithium-ion cell anode member placed against the opposite face of the porous separator layer member, the two-layer lithium-ion cell anode member consisting of a porous layer of lithium-ion cell anode material carried on a porous copper foil, the anode material being placed against the opposite face of the separator layer, the porous copper foil of the two-layer anode member being connected to the anode group terminal; and a second linear stack portion comprising a first porous separator layer, a first reference electrode member, a second porous separator layer, and a second reference electrode member, the first porous separator layer of the second linear stack portion being placed against the porous copper current collector foil face of the two layer anode member, and the first and second reference electrode members each comprising a porous aluminum or copper current collector foil layer covered on at least one face with a reference electrode material, the reference electrode material on both reference electrodes being the same composition which is one composition selected from the group consisting of lithium iron phosphate and lithium titanate, the current collector foil layer of the first and second reference electrodes each having a connector tab; and the first linear stack portion and the second linear stack portion being contained and sealed in an electrically insulated pouch with the anode group terminal, the cathode group terminal, the first reference electrode tab and the second reference electrode tab extending outside the battery pouch.

19. A battery pouch as recited in claim 18 in which the pouch container comprises polymer-coated aluminum foil with the polymer-coated aluminum foil pouch material fully enclosing the cell electrodes with only the anode group terminal, the cathode group terminal, and the tabs of the reference electrodes extending outside the battery pouch.

20. A battery pouch as recited in claim 19 in which the battery pouch is rectangular in shape and the reference electrode tabs are located at the same side of the pouch as the anode group terminal and the cathode group terminal.

* * * * *